Aug. 26, 1930.            H. B. ELDER            1,773,809
                          PLOTTING INSTRUMENT
                          Filed July 1, 1929

INVENTOR
Hubert B. Elder
PER Edward Williams

Patented Aug. 26, 1930

1,773,809

UNITED STATES PATENT OFFICE

HUBERT B. ELDER, OF LOUISVILLE, KENTUCKY

PLOTTING INSTRUMENT

Application filed July 1, 1929. Serial No. 375,030.

In the plotting of topographic survey notes and observations, two methods are at present principally in use. The first of these two methods is the so-called alidade-plane table method. In this method a combination surveying-plotting instrument, or alidade, is movable over a plane-table, or a levelled plotting table carrying the chart or map on which the observations are to be plotted. This method has various serious disadvantages. In this method it is difficult to keep the table accurately levelled due to the movement of the heavy alidade over the plotting surface, high winds, and other extraneous forces, while an exact level is essential to an accurate plot. In addition surveys made by this method are at best less accurate than those made by other methods, and no angles are recorded, and hence no record of the location of the points, so that if the drawings should be lost, the survey would have to be made a second time. These and many other objections tend to make this method of plotting unsatisfactory in practice.

An alternative to the alidade-plane table method is the plotting in the drafting room with ordinary plotting instruments, of notes and observations taken by the stadia-transit method which has, among others, the disadvantage that characteristic features of the ground surveyed must be drawn in from hastily made sketches and notes taken in the field, and these hastily drawn sketches are often so distorted or exaggerated as to be of little value to the one plotting the map.

It is an object of this invention to overcome the difficulties in the above mentioned plotting methods, some of which have been referred to, by providing a plotting instrument adapted to be carried into the field and there used in connection with the stadia-transit method.

Another object of the invention is to provide a portable plotting instrument which may be used either in the field or in the drafting room and which will materially facilitate the plotting of topographic survey notes and observations.

In carrying my invention into effect I provide a heavy base member with a protractor scale and a pivotally mounted scale arm and vernier, whereby a large number of observations may be plotted from the pivoted scale arm after a base line has been established and the protractor oriented with respect to this line.

Figure 1:
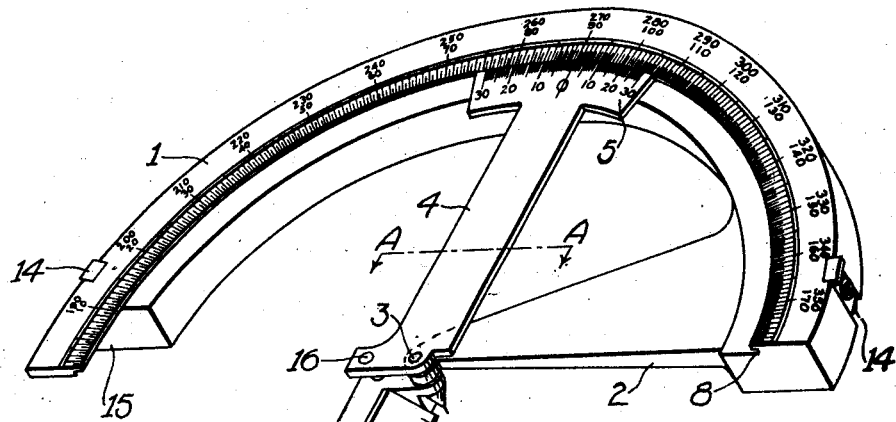
Figure 2:
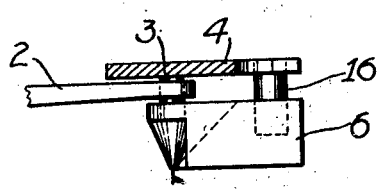
Figure 3:
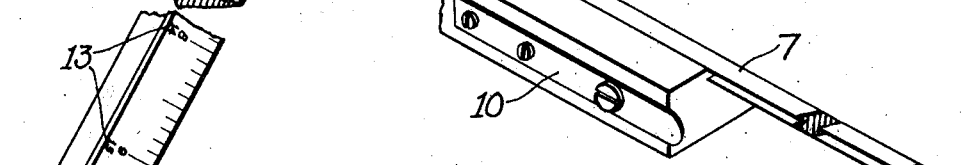
Figure 4:
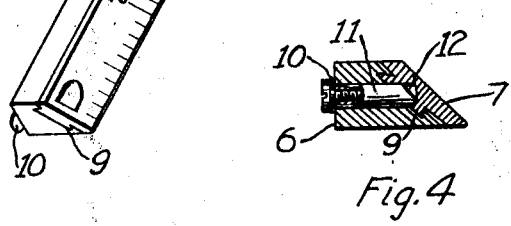

The various features which I believe to be novel and patentable are set forth with particularity in the appended claims, but for a more complete understanding of the invention reference is had to the following description, taken in connection with the drawing in which Fig. 1 is a perspective view of my improved plotting instrument; Fig. 2 is an enlarged section taken along the line A—A of Fig. 1; Fig. 3 is an enlarged view in perspective of the extreme end of the scale arm, and Fig. 4 is a section through the scale arm and scale at the pin 11.

My plotting instrument comprises a base member 1 on which is marked a protractor scale as illustrated. This scale may be graduated into half degrees and may contain two rows of scale markings such as 0°–180° and 180°–360°, though such scale marking forms no part of my invention, and any scale well known in the art may be used. Extending radially inward from that part of the base upon which is marked the protractor scale is the supporting member 2, which, as shown, is an arm integrally connected to the rest of the base and forming a part thereof, but which may consist of a series of arms projecting inward or may be a continuous web. This supporting member may also be connected to the rest of the base by means of cap screws or other well known means rather than being formed integrally with it, it only being essential that the members 1 and 2 should be rigidly connected and form a unitary structure.

Journalled in the inner end of the arm 2 and at the center of the protractor scale is a shaft 3 upon the upper end of which is secured the arm 4, the outer end of which carries a one-minute vernier 5, adapted to cooperate with the protractor scale, so that angles may be set by the instrument to the nearest minute. In order to secure accurate registration of the vernier 5 with the protractor scale, the vernier is provided with an extending tongue (not shown) which engages a groove 8 in the edge of the protractor scale.

On the lower end of the shaft 3 is secured the scale arm 6. As shown more clearly in Fig. 2, the pointer 4 and scale arm 6 are rigidly connected by a dowel pin 16 and rotate as a unit with the shaft 3. The lower end of the shaft 3 terminates in a pin point for centering the instrument. Obviously, any other form of pivotal arrangement of the scale arm and pointer with respect to the base member 1 might be substituted for that specifically shown and described above without departing from the scope of my invention, the preferred embodiment being described as required by the patent statutes. The scale arm 6 is provided with a dovetailed groove into which may be fitted any of a number of different scales 7, each provided with a dovetailed tongue 9 adapted to slide in said slot. The scale arm 6 is so mounted that the edge of the scale 7 is in alignment with the center of the shaft 3 and the zero of the vernier 5, while the bottom of the scale arm 6 and scale 7 is in the plane of the base member 1, so that normally the scale arm 6 and scale 7 rest on the surface of the paper.

The scale which is to be used is inserted at the extreme end of the scale arm 6 and when it has been inserted the full length, a small spring catch 10 snaps a pin 11, fitted into the scale arm, into a hole 12 in the scale 7 when the scale has reached its exact position. This is shown more clearly in Figs. 3 and 4. If additional scale length is desired, it may be had by releasing catch 10 and pulling out the scale 7 until the catch 10 snaps the pin 11 into another hole 12 in the scale. Any number of these holes 12 may be provided at any desired intervals, but I find that a single additional hole near the center of the scale, which is preferably 10 inches in length, is most satisfactory for ordinary requirements. The scale may be marked with a second row of figures 13 to take care of this extended position of the scale.

In order to insure that the base 1 will not move with respect to the paper after it has been once set up, I provide the pins 14 which operate in vertical grooves in the base member and are held in place by spring washers. In order to allow the scale member 6 to swing through a full 180°, the base member 1 is cut away at 15, beneath the protractor scale to allow the scale member to swing underneath.

In operating my improved plotting instrument, the pin in the axis shaft is stuck in the point on the drawing paper representing the station occupied by the transit. The scale arm is then swung around until the edge of the scale lies against the 360° end of the protractor and the entire instrument then rotated about the pin until the edge of the scale lies along the line representing that from which the angles are turned with the transit. The scale arm is then turned until the reading on the protractor and vernier corresponds to the angle as read with the transit, and the distance can then be readily scaled and pointed off on the paper. When the points within 180° have been so plotted, the back of the scale arm is placed against the cut away portion of the protractor and the entire instrument rotated about the axis pin until the edge of the scale lies along the line representing that from which the angles are turned with the transit, and the plotting continued on up to 360°. All turned angles can be read directly with the instrument and, if the survey has been made with reference to azimuths, the instrument can be oriented on the south point and all azimuths read directly.

What I claim and desire to secure by Letters Patent of the United States is:

1. A plotting instrument comprising an arcuate protractor scale provided with an inwardly extending radial arm in the inner end of which is journaled a shaft, the axis of which coincides with the axis of the protractor, a second arm secured to said shaft, one end of which second arm is provided with a vernier adapted to cooperate with said protractor, the other end of which forms a scale arm, the edge of said scale being aligned with the axis of said instrument and the zero of said vernier.

2. A plotting instrument comprising an arcuate protractor scale provided with a radially inwardly extending supporting member in which is pivotally mounted, intermediate its ends, an arm, the axis of the pivot coinciding with the axis of the protractor, one end of said arm forming a linear scale arm and the other end being provided with a vernier adapted to cooperate with said protractor and engaging means between said protractor and said vernier for insuring accurate registration.

3. A plotting instrument comprising an arcuate protractor scale provided with a radially inwardly extending supporting member in which is pivotally mounted, intermediate its ends, an arm, the axis of the pivot coinciding with the axis of the protractor, one end of said arm forming a linear scale arm and the other end being provided with a vernier adapted to cooperate with said protractor, said vernier arm being provided with an extending tongue adapted to be engaged by an arcuate slot in the protractor scale.

HUBERT B. ELDER.